May 7, 1957 H. H. HOLMSTROM 2,791,227
WASHING MACHINE FOR MILKING EQUIPMENT
Filed July 26, 1955 2 Sheets-Sheet 2
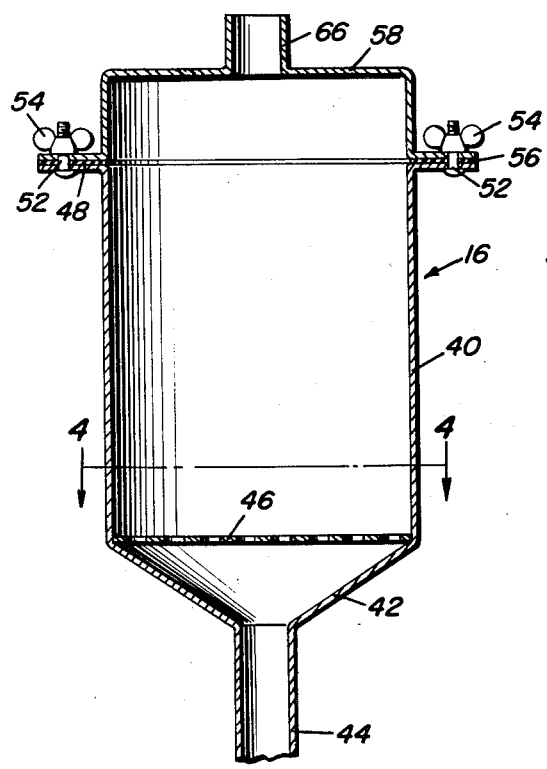
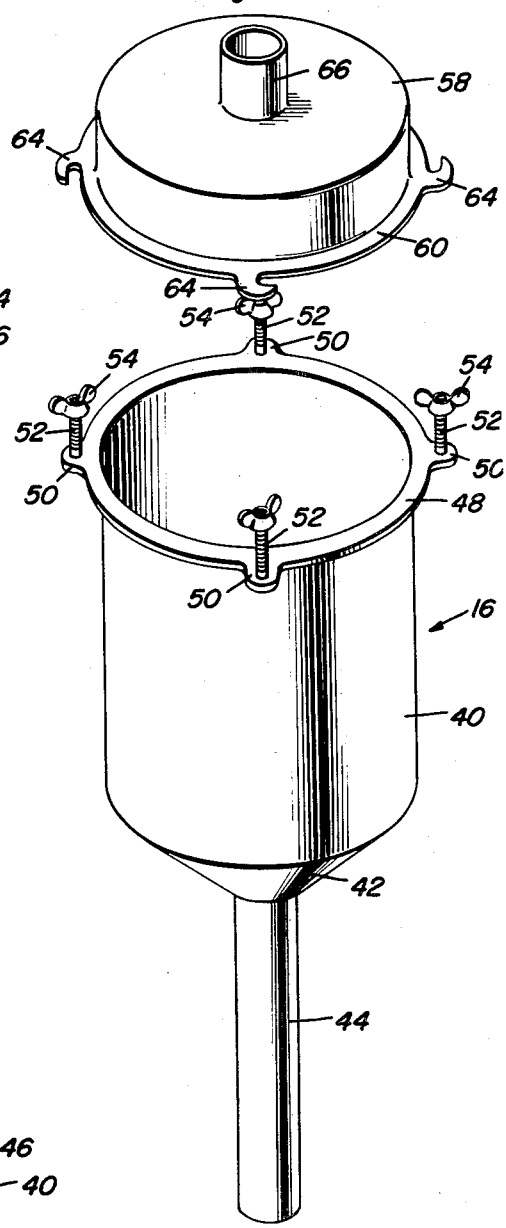
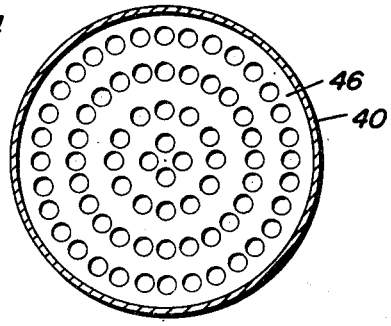
Hartwin H. Holmstrom
INVENTOR.

May 7, 1957  H. H. HOLMSTROM  2,791,227
WASHING MACHINE FOR MILKING EQUIPMENT
Filed July 26, 1955  2 Sheets-Sheet 2
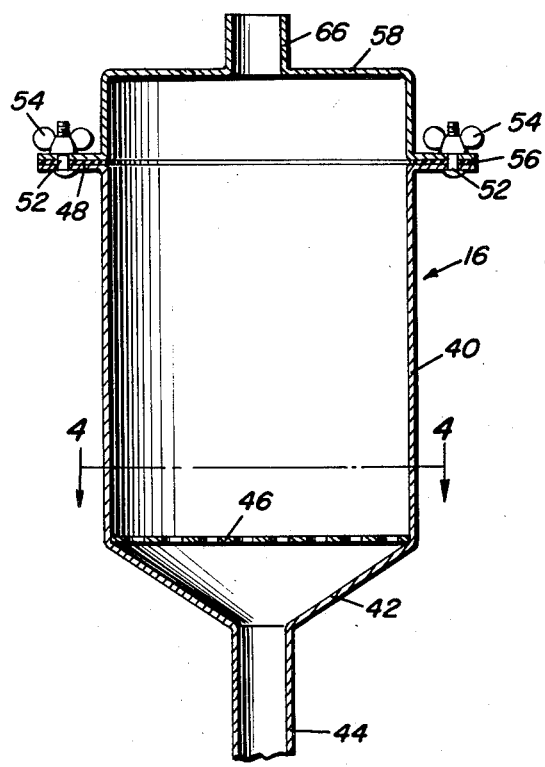
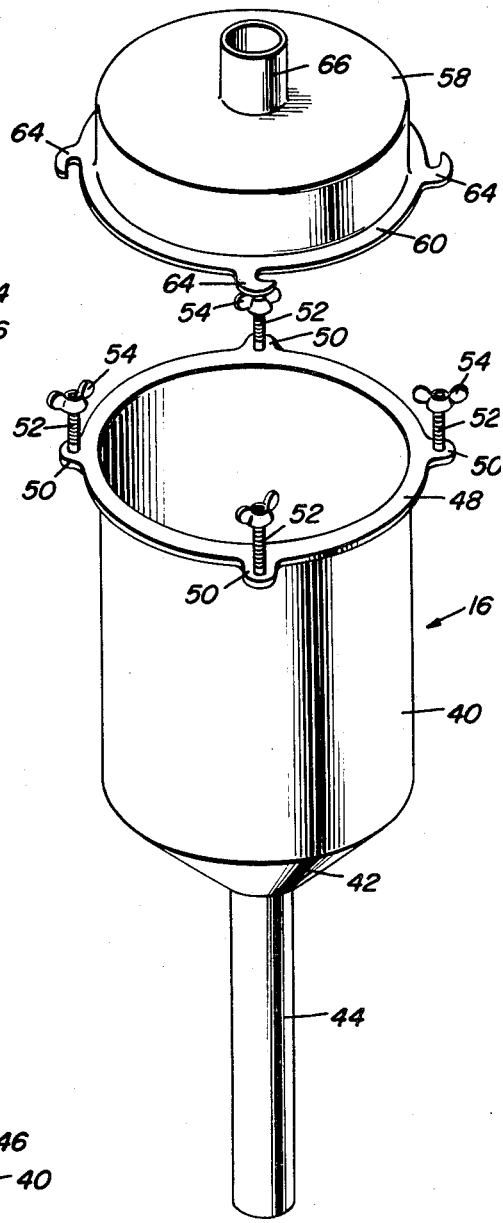
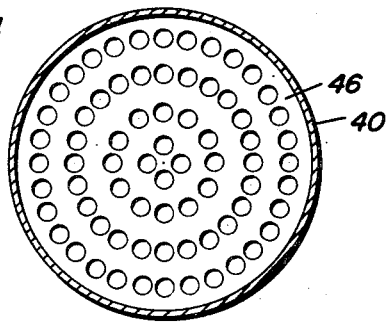
Hartwin H. Holmstrom
INVENTOR.

United States Patent Office 2,791,227
Patented May 7, 1957

2,791,227
WASHING MACHINE FOR MILKING EQUIPMENT

Hartwin H. Holmstrom, Georgetown, Tex.

Application July 26, 1955, Serial No. 524,319

5 Claims. (Cl. 134—169)

This invention relates generally to a surge line system for cleaning milk lines whereby a vacuum source is communicable with an intermediate filling and emptying surge tank in communication with a cleaning fluid vat through a milk line or conduit and is more particularly concerned with providing a cleaning tank in such a surge line cleaning system whereby various milking apparatus contained therein will be thoroughly and expeditiously cleaned.

Accordingly a further object of invention in conformance with that set forth is to incorporate a cleaning tank in a surge-type milk link cleaning system wherein the tank is interposed between a milk line being cleaned which communicates with the surge tank, said tank further communicating with a cleaning fluid vat, wherein various milking apparatus may be deposited in said milk line cleaning tank and will be cleaned simultaneously during the cleaning of the milk line.

A still further object of invention in conformance with that set forth above is to provide in a milk line surge-type cleaning system of the character set forth, a readily usable and highly utilitarian cleaning tank into which milking equipment such as teat cups, pails, lids, gaskets, tubing, etc., may be readily cleaned wherein said tank is readily and economically manufactured, highly efficient in use, readily serviced and maintained, and highly desirable for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a diagrammatic view with portions broken away and in section showing a surge-type milk line cleaning system with the novel cleaning tank incorporated therein;

Figure 2 is an enlarged vertical sectional view through the novel cleaning tank;

Figure 3 is an exploded perspective view of the novel cleaning tank showing the cover member removed; and Figure 4 is a sectional view taken substantially on line 4—4 of Figure 2.

Indicated generally at 10 is a suitable cleaning fluid vat of sufficient capacity to fill a surge tank to be subsequently described, said vat being in ready communication with a source of hot water indicated generally at 12 which is controlled by a suitable valve of a faucet 14, the novel milking apparatus cleaning tank is indicated generally at 16 and communicates with a milk line indicated at 18 which would communicate with suitable milk containing containers in a storage room during the milking process and which must be cleaned out after use. A milk line 18 communicates with a conventional surge tank 20 which includes a container 22 having a lower tubular conduit portion 24 suitably connected to the milk line 18, said tank including suitably disposed therein a float element 26 which raises with the level of the fluid 28 contained in said tank. The float 26 after rising to a predetermined level in said tank actuates a valve mechanism 30 which communicates the interior of the tank 20 with the atmosphere. Negative pressure or vacuum in the tank 20 is a result of the communication of the tank 20 with a conduit 32 in communication with a conventional motor driven suction pump assembly 34. This suction causes the fluid 28 to surge through the milk line 18 from the vat after passing through the cleaning tank 16. When the float operated valve 30 vents tank 20 to the atmosphere, the liquid in tank 20 returns to the vat through line 18 and cleaning tank 16.

The movement of the cleaning fluid from the vat 10 due to the negative or vacuum pressure in the surge tank results in a liquid being drawn through relatively small aperture portions of apparatus such as teat cups, gaskets, tubing, etc., contained in the cleaning tank 16. The liquid is also rapidly urged through such aperture portions when atmospheric pressure is present in the surge tank 20 after the same has been filled.

The vacuum line 32 may have interposed therein in communication with the motor driven suction pump assembly 34 a suitable control valve 36 and a vacuum indicating gauge 38.

The cleaning tank 16 includes a lower container portion 40 of any suitable cross sectional configuration, and includes a lower funnel or cone-shaped bottom portion 42 terminating in a lower tubular communicating element 44 which will communicate with the cleaning fluid 28 contained in the vat 10. Contained in the container 40 and interposed between the interior thereof and the tubular conduit portion 44 is a suitably secured perforated wall portion 46 upon which the various milking apparatus will rest, said perforated partition permitting the ready movement of the cleaning fluid 28 thereby and yet preventing the accidental loss of relatively small components of the cleaning apparatus.

The container 40 includes at its upper edge portion an annular flange 48 which includes a plurality of equidistantly disposed radial lug portions 50 which include suitable aperture portions through which extend connecting bolt elements 52 having threadedly mounted thereon suitable wing nut elements 54. A suitable gasket or sealing element 56 is positionable in overlying relationship upon the flange 48, and a suitable cover member 58 having a lower annular flange portion 60 positionable in overlying sealing relationship on the flange 48 of the container 40 is removably securable by means of the bolts and wing nuts 52 and 54, respectively, the flange 60 of the cover member including radially disposed hook element portions 62, said hook portions opening in substantially parallel relationship to the periphery of the flange 60 of the cover member and being engageable about the bolt elements 52. Thus the cover member 58 upon being rotated in a direction opposite to that which the openings of the hook portions are directed may be readily removed from the container 40 whereafter various portions of the milking system may be inserted in said container. The cover member 58 includes a suitable communicating conduit 66 which communicates with the interior of the container 40, said conduit 66 being engageable in any suitable manner, for example, by means of the flexible hose 68, see Figure 1, for completing communication between the cleaning tank 16 and the surge tank 20.

There has accordingly been disclosed a novel cleaning tank to be utilized in a surge-type cleaning system for milk lines which fully conforms with the objects of invention heretofore set forth.

Various positional directional terms such as "front,"

"rear," "top," etc., are utilized herein to have only a relative connotation to aid in describing the device and are intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a cyclic surge-line flushing and cleaning system for cleaning milking apparatus lines comprising a cleaning vat containing a cleaning fluid solution, a milk line communicable with the cleaning vat to have the cleaning solution cyclically surged therethrough, the other end of the line being communicable with an elevated automatically emptying surge tank, and a siphoning assembly operatively connected to the surge tank for applying a negature pressure in the surge tank which is interrupted at regular intervals by temporarily venting the tank to the atmosphere in order to empty said tank through the milk line into said vat; a milking equipment cleaning tank for containing teat cups, connecting tubes, pails, lids, gaskets and the like of milking systems, said cleaning tank comprising a container disposed below the surge tank and interposed in communication between the milk line and cleaning vat permitting cleaning fluid to be surged therethrough in relation to the emptying and filling of the elevated surge tank, said container including a lower milking equipment containing portion having a portion communicating with the liquid in said cleaning vat, a removable cover secured on said container, sealing means interposed between said cover and container portion, and communicating means on said cover communicating with the milk line.

2. In a cleaning tank of the character set forth in claim 1 wherein the equipment containing portion of said cleaning tank includes a perforated partition interposed therein permitting the passage of cleaning fluid therethrough while supporting the parts for being cleaned within said cleaning tank.

3. A cleaning system for milking equipment comprising a vacuum pump, a surge tank, a float control valve in said surge tank, said valve being vented to the atmosphere, a vacuum line connected to said pump and to said valve, a cleaning vat adapted to contain a cleaning fluid, a cleaning tank having an opening and adapted to support articles to be cleaned, means in registry with said opening and submerged in the liquid in the cleaning vat for conducting liquid to and from said cleaning tank and said vat and a fluid line extending from said surge tank to said cleaning tank whereby upon actuation of said suction pump a vacuum is created in said surge tank to draw liquid from the vat through said cleaning tank and fluid line and into said surge tank so that said float is elevated with the liquid level in said surge tank and upon reaching a predetermined level in the surge tank, said float opens said valve in order to vent the surge tank thereby breaking the vacuum therein and permitting the liquid in the tank to be gravity returned through said fluid line and cleaning tank into said vat.

4. The combination of claim 3 wherein said cleaning tank includes a tank body, a perforated partition in said tank body to support articles that are to be cleaned, a cover, means releasably securing said cover to said tank body, and said fluid line being operatively connected with said cover to establish fluid flow therethrough.

5. For use in a surge line cleaning system, a cleaning tank comprising a tank body, a partition disposed in said tank body and provided with an opening through which liquid is adapted to pass, said partition separating said tank body into separate chambers that are intercommunicated by the opening in said partition, a cover on said tank body, means releasably fastening said cover to said tank body, a gasket in sealing relationship between said cover and tank body, and liquid inlet and outlet means connected to said cover and said tank body respectively, one of said means being in communication with one of said compartments and the other of said means being in registry with the other of said compartments.

References Cited in the file of this patent

UNITED STATES PATENTS

| | | |
|---|---|---|
| 635,961 | Hasson | Oct. 31, 1899 |
| 846,649 | Curatolo | Mar. 12, 1907 |
| 2,233,852 | Schmitt | Mar. 4, 1941 |
| 2,702,767 | Domingo | Feb. 22, 1955 |
| 2,717,576 | Hansen | Sept. 13, 1955 |

FOREIGN PATENTS

| | | |
|---|---|---|
| 75,059 | Denmark | Dec. 1, 1952 |
| 77,775 | Denmark | July 5, 1954 |